United States Patent [19] [11] 3,868,265
Sakai et al. [45] Feb. 25, 1975

[54] METHOD OF MANUFACTURING COATED STEEL PIPES

[75] Inventors: Tomoharu Sakai, Toyonaka; Kaname Matsui, Nishinomiya, both of Japan

[73] Assignee: Sumitomo Metal Industries Limited, Osaka, Japan

[22] Filed: Sept. 6, 1972

[21] Appl. No.: 286,825

[30] Foreign Application Priority Data
Sept. 6, 1971 Japan.............................. 46-69112
Sept. 18, 1971 Japan.............................. 46-72821

[52] U.S. Cl.................... 117/18, 117/17, 117/21, 117/75, 117/93.31, 117/94
[51] Int. Cl. ................ B44c 1/094, B44c 1/114
[58] Field of Search ........ 117/18, 21, 94, 75, 93.31, 117/17; 156/244, 500

[56] References Cited
UNITED STATES PATENTS
2,929,744  3/1960  Mathes et al. ............... 117/93.31
3,207,618  9/1965  De Hart....................... 117/18
3,211,598  10/1965 O'Brien....................... 156/244 X
3,288,638  11/1966 Van Paassen et al........... 117/93.31
3,554,886  1/1971  Colomb et al. ............... 117/93.31
3,561,493  4/1965  Maillard et al. ............... 156/244 X
3,687,704  8/1972  Stanley et al. ............... 117/21

FOREIGN PATENTS OR APPLICATIONS
1,924,199  11/1970 Germany....................... 117/94
981,078    1/1963  Great Britain................ 117/75

Primary Examiner—William D. Martin
Assistant Examiner—Shrive P. Beck
Attorney, Agent, or Firm—Watson, Cole, Grindle & Watson

[57] ABSTRACT

A method for producing coated steel pipes. The steel pipe is initially preheated to a predetermined temperature. Subsequently a powdery modified thermoplastic synthetic resin is sprayed over the outer surface of the preheated pipe so as to form a sticky thin film. An inner layer is then formed on the steel pipe by coating a non-rigid synthetic resin onto the sticky thin film. Finally, an outer layer is formed over the inner layer, which outer layer is a rigid synthetic resin of a chemically similar type of material as that of the non-rigid synthetic resin. When the outer layer is so formed over the inner layer, a blended intermediate layer is formed between the inner and outer layers. After the coatings are formed on the steel pipe, a plurality of press rollers forcibly press the inner and outer layers onto the entire surface of the steel pipe.

3 Claims, 10 Drawing Figures

PATENTED FEB 25 1975 3,868,265
SHEET 1 OF 3
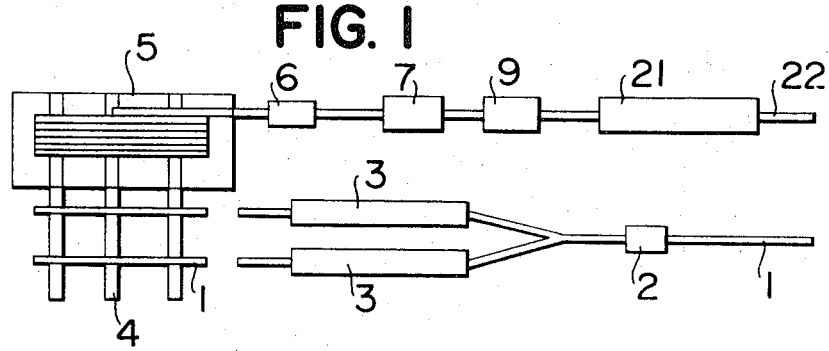
FIG. 1
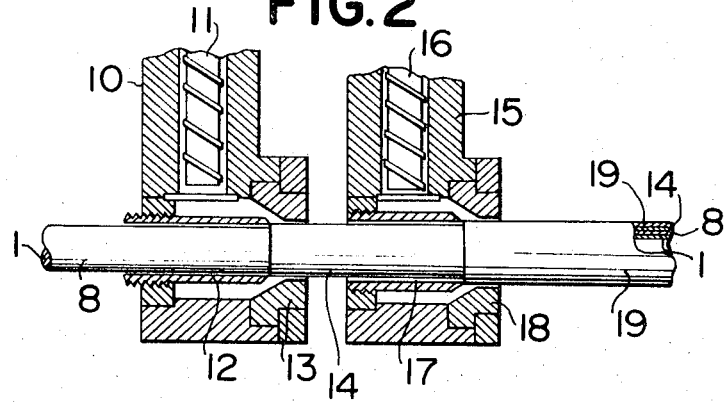
FIG. 2
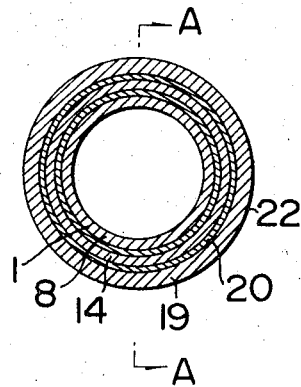
FIG. 3
FIG. 4

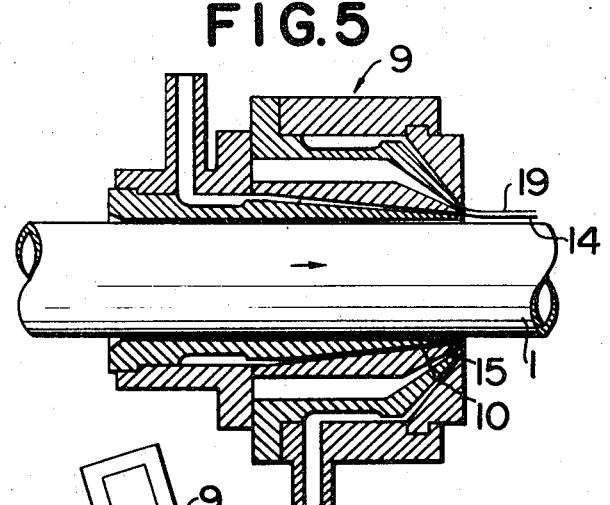
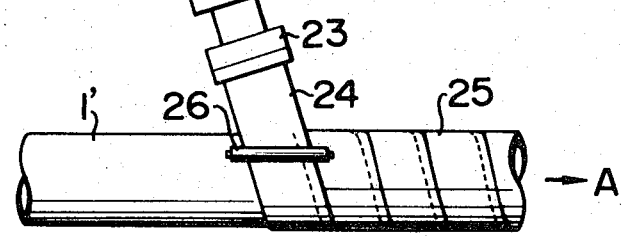

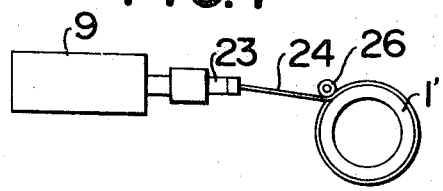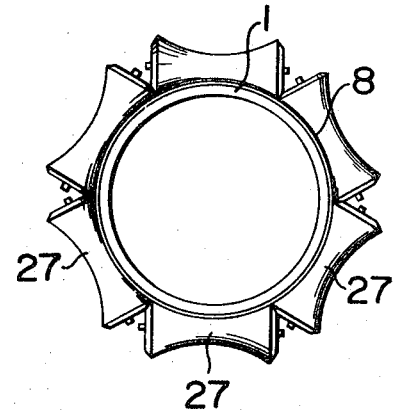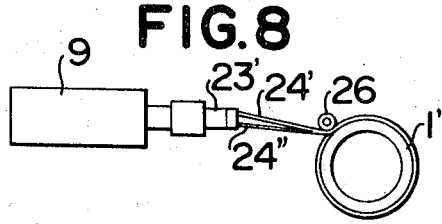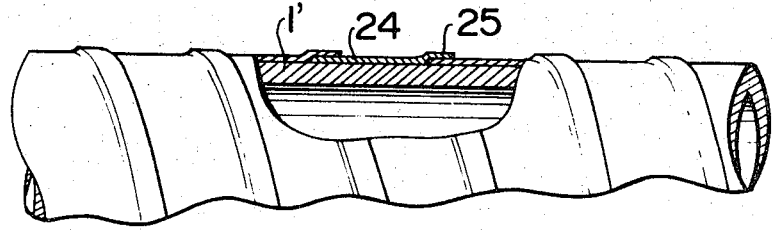

METHOD OF MANUFACTURING COATED STEEL PIPES

BACKGROUND OF THE INVENTION

This invention relates to a method of manufacturing coated steel pipes using thermoplastic synthetic resins, chiefly polyolefine polymers and copolymers and modified resins thereof.

Coated steel pipes coated with synthetic resin have been obtained by various methods. In one method, an adhesive is applied over the outer surface of the steel pipe and over the adhesive a coating of synthetic resin which is extruded from an extruder is applied. In another method, an adhesive is first applied and a synthetic resin pipe having a thermally contractable character is then thermally attached to the adhesive. In a further method, a synthetic resin powder is used as a coating powder and fusion bonded to the steel pipe through such methods as fluidized bed coating and electro-static coating. In a still further method, an adhesive is applied to a tape-like synthetic resin film, which is then wound on the surface of the steel pipe.

The coating structures obtained in the above manner encounter various inconveniences in practical use, however because the coating structure does not stick closely to the pipe surface. Even where a sufficiently close connection can be obtained, there remain various drawbacks. One such drawback, for example, is that imparting a thermally contractable character to the resin leads to a high cost. Additionally, in the case of the resin film, its character is significantly deteriorated during subsubsequent processes. Furthermore, in the case of powder resin which is expensive, there is a limitation in the thickness of the coating structure that can be obtained. Finally, in any of these cases, it has been difficult to expect to achieve a sufficient corrosion-proof character.

SUMMARY OF THE INVENTION

A first object of the invention is to provide a method of maanufacturing covered steel pipes, which can overcome the above various drawbacks. More particularly, the invention features a method of manufacturing coated steel pipes utilizing a fused thin film of a modified thermoplastic resin having an adhesive character. Such a film can include, for instance one composed of polyolefin powder containing 10 to 30 parts of butyl rubber or isobutyl rubber, one containing epoxy resin opening the linkage thereof at a temperature of 200° to 220°C or one imparted partly with polarized characters by $SO_2$, Cl and so forth. The film is first coated on the outer surface of the steel pipe, and then a high quality rigid and/or non-rigid thermoplastic synthetic resin, for instance low density or high density polyethylene containing carbon powder, which enhances whetherprooving and other propertice is applied.

A second object of the invention is to provide a method of manufacturing coated steel pipes, which permits obtaining a coating structure in the state of a sufficient close hit to the steel pipe and providing sufficient corrosion-proof character.

More particularly, the invention features a second method, in which a resin powder obtained by irradiating a usual resin powder by an electron beam of 2 to 10 MRad is first applied over the steel pipe surface in a condition pre-heated to a temperature of 150°C or above through an electrostatic method or fluidized bed coating method. Subsequently, the same or a similar synthetic resin powder such as polyethylene or polypropylene, which has not been irradiated, is stuck to the first or inner layer, formed on the steel pipe surface for the formation of a corrosion-proof covering structure. The afore-mentioned dosage of irradiation is not limitative.

A third object of the invention is to provide a method of manufacturing coated steel pipes, in which sized and non-sized synthetic resins extruded from a compound extruding head are pressure stuck to the steel pipe by a press roller means for the purposes of improving the operational efficiency and excluding air bubbles to ensure a sufficiently closely sticky state of the coated structure.

BRIEF DESCRIPTION OF THE DRAWINGS

In order for the invention to be fully understood, it will now be described in connection with the accompanying drawings, in which:

FIG. 1 is a layout illustrating various sections in the manufacture of coated steel pipes by the method according to the invention;

FIG. 2 is a fragmentary sectional view of an extruder employed in the method according to the invention;

FIG. 3 is a cross sectional view of a coated pipe manufactured according to the invention;

FIG. 4 is a fragmentary sectional view taken along line IV—IV in FIG. 3;

FIG. 5 is a sectional view showing another extruder having a compound head employed in the method according to the invention;

FIG. 6 is a view to illustrate a step of manufacture of large diameter coated steel pipe according to the invention;

FIG. 7 is a view, on a reduced scale, of the set-up of FIG. 6 viewed in the axial direction of the pipe;

FIG. 8 is a view similar to FIG. 7 but showing a different set-up in the corresponding manufacturing step;

FIG. 9 is a pictorial perspective view, partly broken away, showing a coated steel pipe obtained by the method according to the invention; and FIG. 10 is a front view of a press roller arrangement employed in accordance with the invention;

DESCRIPTION OF THE PREFERRED EMBODIMENTS

Referring now to FIG. 1, steel pipe 1, after being transferred from a pipe stock through a suitable conveyor means and having been subjected to a pre-treatment of pickling or drying by sudden heating with bare combustion gas flame or the like for facilitating the removal of scale and other contaminant matter, reaches a shot blast section 2, where the pipe surface is cleaned. Then, the pipe is pre-heated in a pre-heating section 3 to a temperature somewhat higher than a pre-determined temperature. The pre-heated pipes are then transferred through conveyor means 4 to an heating furnace section 5, where they are held at the aforesaid predetermined temperature prior to being fed to a connecting section 6. The pipes which have a constant length and are successively fed to the connecting section 6 are connected together with auxiliary joints (not shown) into a continuous pipe, which is then fed to a coating section 7.

In the coating section 7, an adhesive modified resin powder in the sticky state is sprayed over the outer surface of the pipe 1 to form a thin sticky resin coating 8 on the pipe.

The pipe 1 provided with the thin coating layer 8 is then immediately fed to an extruder section 9. FIG. 2 shows an example of the extruder, which has two extruding heads 10 and 15. In the first extruding head 10, a non-sized synthetic resin in the sticky state and held at a predetermined elevated temperature is forced out by an extruding screw 11 between inner and outer dies 12 and 13. The resin thus extruded is coated as inner layer 14 on the thin coating layer 8. In the second extruding head 15, a rigid synthetic resin whose mechanical strength is high as compared to the previous non-rigid resin and which is held in the fused state and at a predetermined elevated temperature, is forced out by an extruding screw 16 between inner and outer dies 17 and 18, respectively, for the formation of an outer layer 19 on the inner layer 14.

The steel pipe 1 is fed to the extruder section 9 immediately after the formation of the thin coating layer 8, so that the sticky state of the coating layer 8 may be maintained when the inner layer 14 of the non-rigid resin is formed thereon. Thus, the close fit between the adjacent layers 8 and 14 may be obtained. Furthermore, since the outer layer 19 of the rigid resin is formed while the inner layer 14 remains in the fused state immediately after the formation thereof, the non-rigid and rigid synthetic resins of the respective layers 14 and 19 are partly blended together to form an intermediate layer 20. Thus, the close contact between both the inner and outer layers 14 and 19 may be obtained.

The steel pipe 1 having been provided with the inner and outer coating layers 14 and 19 in the above manner is then passed through a cooling section 21 for sudden cooling, or alternatively it may merely be left to slowly cool down, thus obtaining a product coated steel pipe as indicated at 22.

The foregoing description involves an integrated process where the steep pipe 1 is held at a heated state for the formation of the thin coating layer 8 in the coating section 7. This is, however, by no means limitative, but the layer 8 may be formed in any other suitable way, for instance, it may be formed in the coating section 7 through electrostatic coating of the steel pipe 1 in the cold state with a synthetic resin in a powdery state or in fluid state over the surface of the pipe 1, followed by sudden heating of the layer thus formed. Also, while the inner and outer layers 14 and 19 are formed immediately after the formation of the layer 8, it is of course possible to render the layer 8 or 14 into the sticky or fused state for the sole purpose of forming an outer layer on it.

The thickness of the thin coating layer 8 preferably ranges between 0.1 to 0.3 mm. With a thickness below this range, the corrosion proof property will be deteriorated, while a thickness above this range is prone to a wavy or wrinkled form of the layer. The non-rigid and rigid synthetic resins for the respective inner and outer layers 14 and 19 preferably have chemically stable properties substantially the same as or superior to the synthetic resin for the layer 8. From the standpoint of physical and chemical stabilities, high density polyethylene with a density of 0.914 to 0.903 gr./cm$^3$ and a molecular weight of 18,000 to 42,000 is suited for the inner layer 14. From the physical stability standpoint, high density polyethylene with a density of 0.940 to 0.965 gr./cm$^3$ and a molecular weight of 30,000 to 60,000 is suited for the outer layer 19.

The double-layer coating structure consisting of inner and outer layers closely contacted with one another provided in accordance with the invention has proven to be significantly superior to a single-layer coating structure (without a provision of coating layer 8 of powdery resin) of a non-rigid or rigid synthetic resin of the same character as the non-rigid or rigid resin used to form the coating structure according to the invention. In drop tests, coating structures consisting of a single layer of a non-rigid resin sufferred damages reaching to the steel pipe body. In weight drop tests, both coating structures consisting of a single layer of a non-rigid resin and those consisting of a single layer of a rigid resin sufferred damages reaching to the steel pipe body. In flattening tests, coating structures consisting of a single layer of a rigid resin totally peeled off the steep pipe body. In contrast, the coating structure according to the invention sufferred only slight recognized scratches and depressions through-out the above tests.

The pronounced superiority of the coating structure obtained in accordance with the invention is thought to be attributable to the fact that the outer layer 19 having sufficient mechanical strength and the inner layer 14 capable of effectively relieving or absorbing shocks are integrally stuck to the steep pipe 1 through the thin layer 8.

While in the preceding embodiment the inner and outer layers 14 and 19 were formed by the respective extruding heads 10 and 15 arranged in series, it is also possible to form them at one time by using a compound extruding head as shown in FIG. 5.

Furthermore, the thin coating layer 8 may of course be formed through extrusion by using an extruder in place of the aforementioned spraying.

Moreover, to further improve the state of a close connection of the coating layer on the pipe outer surface, the sticky synthetic resin which may be usually extruded from an extruder may be rendered into pressure contact with the steel pipe.

FIG. 10 shows a press roller arrangement, which may be used to this end. It consists a plurality of press rollers 27 (usually six rollers being suitable for outer diameters up to 300) made of a heat-resisting rubber (for instance silicone rubber) with a hardness of 30 to 70.

As the steel pipe with the fused resin extruded thereon is passed through this roller arrangement, the resin is rendered into forced contact with the steel pipe surface, so that the resin can fit into even extremely slight surface irregularlities to ensure an improved close contact state of the resin with the pipe surface. Also, by this means air bubbles may be excluded.

The sticky state of the coating layer, i.e., the innermost layer, stuck to the steel pipe surface may be improved still further by placing a resin powder which has been irradiated by an electron beam in its powdery state into a close fit with the surface of the steel pipe at a temperature above its melting point, because the fluidity of the powdery resin at that temperature is lost due to its irradiation by the electron beam. As resin particles are accumulated on the steel pipe surface, they form a porous coating laayer having extreme outer surface irregularities and minute internal gaps or pores. After the formation of the porous coating layer, the same resin as that of the porous layer but not irradiated by any electron beam may be applied in the sticky state over the porous layer, whereby the sticky resin will fit itself in the afore-mentioned internal gaps and surface irregularities and be completely stuck to the porous layer. In this manner, a perfect corrosion-proof coating layer may be formed.

It is to be emphasized that the powdery resin having been irradiated by an electron beam will show a rubber-like resiliency but will not show any fludity at a temperature above its melting point, and also it provides for an improved sticky state due to an oxidizing reaction that took place on the resin particle surface at the time of irradiation by the electron beam. The improved sticky state is evident from various tests conducted on various coating layers 150 to 200 microns in thickness formed on a steel plate 0.5 mm thick. The coating layer was formed by holding a fixing temperature of 230°C for 8 to 10 minutes. Table 1 below lists results of the tests. For some tests, 5 cycles of immersion in boiling water for 7 hours followed by immersion in cold water for 17 hours were repeated. Low density polyethylene was used as the coated layer material, and 30 parts of powdery polyethylene not irradiated by an electron beam and 70 parts of powdery polyethylene having been irradiated by an electron beam were mixed to prepare the material.

is possible to utilize a general-purpose extruder and die head, that is, no particular type of equipment is required. Also, the winding step is very simple, so that it is possible to maintain a constant thickness of the strip-like plastic coating material being wound. Furthermore, since the material is forcibly fused to the pipe while excluding air bubbles between the material and pipe, it is possible to ensure close fusion between the two.

Furthermore, similar effects may be obtained by replacing the press roller 26 by the press roller arrangement of a suitable number of press rollers 27 as described earlier in connection with FIG. 10. As has been described, according to the invention the thin coating film 8 is formed directly on the outer surface of the steel pipe 1 by spraying a resin in the form of powder or fluid, so that the required and sufficient oxidation can be obtained under an optimum temperature condition to ensure sufficiently close fusion between the film 8 and steel pipe 1. The aforementioned oxidation effect is insufficient where a thermoplastic synthetic resin such as polyethylene is coated on the steel pipe surface by the extrusion method, and in such a case it has been difficult to obtain sufficiently close contact.

In addition, since the inner and outer layers 14 and 19 are fused respectively with the film 8 and inner layer 14 for integral sticking of these layers to the steel pipe, Table 1

| Extent of irradiation of electron beam | Erichsen Tests | | Bending Tests | | 1/10mm cross hatch and erichsen test with adhesive tape | |
| --- | --- | --- | --- | --- | --- | --- |
| | 5 mm | 8 mm | Pinched | Contact state | Before immersion in boiling water | After immersion in boiling water |
| None | Slightly inferior | Peeled out | Slightly inferior | Peeled out | 81/100 | 59/100 |
| 6 MRad | Good | Good | Good | Good | 98/100 | 85/100 |
| 12 MRad | Good | Good | Good | Good | 95/100 | 88/100 |

FIG. 6 shows a step of another embodiment of the method according to the invention applied in the manufacturing of a large diameter coated steel pipe. In this embodiment, a pre-heated large diameter steel pipe 1' is simultaneously rotated and advanced in the axial direction A, while a plastic coating material 24 is extruded in the form of a strip having a constant width, from a die head 23 of an extruder 9 toward the outer periphery of the pipe 1' in a direction at an angle with respect to the direction of progress of the pipe. Since the large diameter steel pipe 1' is simultaneously rotated and advanced in the axial direction, the extruded strip of the plastic coating material 24 may be helically wound on the periphery of the pipe 1' while forming a suitable lap 25. Immediately before the strip-like coating material 24 is wound on the large diameter steel pipe 1', it is pressed by a press roller 26 at a large angle, thereby excluding air between the coating material 24 and the steel pipe 1', while at the same time forcibly bringing the coating material 24 into close fusion with the periphery of the steel pipe 1'.

Since in this embodiment the large diameter steel pipe is simultaneously rotated and advanced in the axial direction for helically winding the plastic coating material extruded in the strip-like form on the pipe, it the value of the inner and outer layers 14 and 19 may be further enhanced.

The coated steel pipe obtained in accordance with the invention, unlike the usual products, does not require any package, so that handling of the pipe is simpler. The sticky state is also excellent, since no inconvenience is encountered in the working of the coated steel pipe according to the invention, such as for instance in thread cutting. Furthermore, the impact resisting property of the coating structure according to the invention is excellent.

Furthermore, through the lamination of a powder resin layer of irradiated resin powder not fusing even when the melting point is exceeded and a layer of non-irradiated powder resin having fluidity, the fusion state can be widely improved, so that it is possible to obtain a far superior corrosion-proof character compared to the prior-art corrosion-proof steel pipe. Of course, in this case, a layer of a synthetic resin having superior impact-resisting property may be formed on the non-irradiated powder resin layer.

The following Tables list various properties and other data of examples of the coating structure obtained according to the invention, and also give comparison of the coating structure according to the invention and prior-art coating structures.

Table 2

Material and Process Conditions for Coating Structures according to the Invention

|  | Type of Coating Method | Type of Resin | Remarks | Molecular weight | Melt | Density | Steel Pipe Preheating Temperature in Degress Centrigrade | Resin Temperature in Degrees Centigrade |
|---|---|---|---|---|---|---|---|---|
| Ex. 1 | Double-layer extrusion | 1-st layer L.D. PE | Containing synthetic rubber | 42.000 | 0.3 | 0.942 | 210 | 190 |
|  |  | 2-nd layer H.D. PE |  | 105.000 | 0.19 | 0.940 | 210 | 230 |
| Ex. 2 | Double-layer extrusion | 1-st layer L.E. PE | Partly polarized by chlorination | 15.000 to 60.000 | — | — | 140 | 137 |
|  |  | 2-nd layer H.D. PE |  | 105.000 | 0.10 | 0.940 | 140 | 230 |
| Ex. 3 | Powder coating plus double-layer extrusion | 1-st layer L.D. PE powder | Containing synthetic rubber | 33.000 | — | 0.924 | — | — |
|  |  | 2-nd layer L.D. PE |  | 42.000 | 0.3 | 0.942 | 210 | 192 |
|  |  | 3-rd layer H.D. PE |  | 105.000 | 0.19 | 0.940 | 210 | 240 |
| Ex. 4 | Irradiated powder coating plus double-layer extrusion | 1-st layer L.D. PE powder | 50% powder with 6 MRad | 30.000 | 0.7 | 0.024 | 210 | 190 |
|  |  | 2-nd layer L.D. PE | Containing Synthetic Rubber | 42.000 | 0.3 | 0.924 | 210 | 190 |
|  |  | 3-rd layer H.D. PE |  | 105.000 | 0.19 | 0.940 | 210 | 230 |

Table 2'

Physical properties of the examples of Table 2

|  | Thickness mm | Initial adhesion strength (kg/cm) (The test was done by 180 deg. peeling of 1cm width at room temperature.) | Impact strength (kg/cm)(The test with ¼ inch impact head and 1 kg load. Pinhole test with 10 kv) | Adhesion strength after immersion in supply water (kg/cm) (Similar test as that for the initial contact state was done after immersion in supply water.) One month | Two months | ESCR test after flattening (The test was done by immersion in a surface activator (10 percent Igepal liquid) at 50 deg. C for 96 hours after ½D flattening.) |
|---|---|---|---|---|---|---|
| Ex. 1 | 0.95 | 4.5 to 6.0 | 30 | 2.0 to 2.8 | 1.0 to 1.5 | Compressed side; Satisfactory Stretched side; Slight cracks |
| Ex. 2 | 0.80 | 3.0 to 4.0 | 30 | 3.4 to 3.8 | 3.5 to 4.0 | Satisfactory on either side |
| Ex. 3 | 1.05 | 5.0 to 7.0 | 40 | 4.5 to 5.5 | 1.0 to 1.5 | Satisfactory on either side |
| Ex. 4 | 1.0 | 5.0 to 7.0 | 40 | 4.5 to 60 | 2.5 to 3.0 | Satisfactory on either side |

Table 3

Comparison of coating structure according to the invention and prior-art coating structures

|  | Coating structure according to the invention | Prior-art coating structure formed by once wound asphalt-impregnated-jute | Prior-art coating structure struck with adhesive |
|---|---|---|---|
| Thread cutting test (in factory, using pipe thread cutting machine) | The cut surface was good. The bruise due to chuck was shallow, being formed only in the outer layer. H. test: Passed | Direct thread cutting was impossible | Thread cutting was somewhat difficult at the adhesive layer. Chuck bruise was somewhat deep. H test: Rejected |
| Cutting test with pipe cutter (under the on-side condition, with the pipe supported by chain-tongs) | Cutting surface was good. Slight blemish was recognized at supported portions. H Test: Passed | Blemish reaching the outer steel surface was recognized. H test: Rejected | Cut surface was good. Blemish was recognized at supported portions, but no steel surface was seen. H test: Passed |
| Flattening test (using Amsler tester for compression flattening until one-third of the outer pipe diameter was reached) | Discoloring and wrinkling of the covering structure was recognized H test: Passed |  | Resultant outer appearance was good. H test: Passed |
| Volume Resistivity (ohm-om) | $1.9 \times 10^{16}$ | $10 \times 10^{15}$ |  |
| Breakdown voltage (kV/mm) | 27 | 12 |  |

(Note) H test impression voltage: 10,000 volts

Table 4

Comparison of coating structure according to the invention and prior-art coating structures

| | | Coating structure according to the invention | Prior-art coating structure formed by once wound asphalt-impregnated-jute | Prior-art coating structure struck with adhesive |
|---|---|---|---|---|
| Burrying test (conducted the tested pipe within a ditch (0.3 to 0.4 m deep and laying concerte over the surrounding matter) | In sand | No scrutches were recognized. H test: Passed | Slight bluise was recognized. H test: Passed | No scrutches were recognized. H test: Passed |
| | In red earth | Slight blemish was recognized. H test: Passed | Depressions and slight embedded small stones were recognized. H test: Passed | Slight blemish was recognized. H test: Passed |
| | In gravel | Slight strutches were recognized. H test: Passed | Many depressions and embedded small stones were recognized. H test (5,000V):Rejected | Slight scrutches were recognized. H test: Passed |
| | In gravel and sraight pieces (3:1) | Slight blemish and slight scrutches were recognized. H test: Passed | Much blemish was recognized. H test (7,000 V): Passed | Slight blemish and slight scrutches were recognized. H test: Passed |
| Drop test (by dropping the tested pipe from a pipe rack with a height of about 2 m) | On red earth | Slight scrutches were recognized. H test: Passed | Slight bruise was recognized. H test Passed | Slight scrutch and bluise at pipe and were recognized. H test (at buised portion). Rejected |
| | On gravel | Almost no outer scrutches were recognized. H test: Passed | Blemish was recognized at two portions. H test at blemished portion: Rejected | Almost no outer scrutches were recognized. H test: Passed |
| | On concrete | Slight scattered blemish was recognized. H test: Passed | Slight scattered blemish was recognized. H test: Passed | Scattered blemish was recognized. H test: Rejected |
| Impact test (by dropping a weight of 6.3kg (20 R at the end) from the height of 0.5m and 1.0m | 0.5 m | Only depressions were recognized. H test: Passed | Only depressions were recognized. H test: Passed | Only depressions were recognized. H test: Passed |
| | 1.0 m | Only depressions were recognized. H test: Passed | Only depressions were recognized. H test: Passed | Only depressions were recognized. H test: Rejected |
| Soil resistance test | | Resistance was large | Resistance was small | |

Table 5

Comparison of coating structure according to the invention and prior-art coating structure (Chemical properties)

| | | Coating structure according to the invention | Prior-art coating structure formed by once wound asphalt-impregated jute |
|---|---|---|---|
| Heating-cooling test (conducted by subjecting test pieces NBI" by 100 mm to 24 cycles of immersion in hot water at a temperature of 60 deg. C for 8 hours followed by immersion in salt water solution at a temperature of −5 deg. C for 16 hours) | | No abnormal state of the coating structure was recognized. | The surface of the structure became extremely irregular and discolored. |
| Water absorption test(conducted by immersing test coating plastic film 25 $cm^2$ by 1.0 mm in supply water for 60 days. | | Water content increase for 60 days immersion | Prior-art coating structure: 0.12 mg/25$cm^2$ Coating structure according to this immersion: 0.02 mg/25$cm^2$ |
| Chemical tests (conducted by immersing test pieces NBI" × 100 mm in Chemicals listed in the right) | 10% salt water solution at normal temperature for one month | No abnormal state was recognized. | No abnormal state was recognized. |
| | 10% sulfric acid solution at normal temperature for one month | No abnormal state was recognized. | Partial discoloring was recognized. |
| | 10% nitric acid solution at normal temperature for one month | No abnormal state was recognized. | Partial discoloring was recognized. |
| | 40% caustic soda solution at normal temperature for one month Water solution of 1,000 PPM chlorine at normal temperature for one month Sea water at normal temperature for three months Petroleum Ethylalcohol | No abnormal state was recognized. No abnormal state was recognized. Surface was hardened. Surface was hardened. | Partial discoloring was recognized. No abnormal state was recognized. Dissolved. Dissolved. Dissolved. |

What is claimed is:

1. A method of producing coated steel pipes, comprising the steps of: preheating a steel pipe to a predetermined temperature; spraying a powdery modified thermoplastic synthetic resin over the outer surface of such preheated steel pipe, so as to form a sticky thin film having a thickness of 0.1–0.3mm; forming an inner layer on such steel pipe by coating a non-rigid synthetic resin in a sticky state onto the sticky thin film by the use of a first extruding head; forming an outer layer on such steel pipe by coating a rigid synthetic resin in a sticky state and of a chemically similar type of material as that of the non-rigid synthetic resin onto the inner layer by use of a second extruding head, thereby forming a blended intermediate layer between the inner and outer layers; and, forcibly pressing the inner and outer layers onto the entire surface of such steel pipe by the use of a plurality of press rollers made of a heat-resisting rubber with a hardness of 30 to 70.

2. The method of producing coated steel pipes according to claim 1, wherein a powdery thermoplastic synthetic resin having been exposed to irradiation by an electron beam of 2 to 10 MRad is sprayed over the steel pipe outer surface to be stuck thereto and a synthetic resin of a chemically similar type as that of the powdery synthetic resin and which is not irradiated is provided in the form of a thin film on said outer surface stuck with the first mentioned synthetic resin.

3. The method of producing coated steel pipes according to claim 1, wherein said step of forcibly pressing by means of press rollers surrounding the steep pipe excludes any air bubble between the resin layer and the steel pipe.

* * * * *